Figure 5:
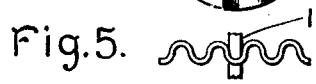

No. 779,737. PATENTED JAN. 10, 1905.
L. T. ROBINSON.
SHUNT FOR ELECTRICAL MEASURING INSTRUMENTS.
APPLICATION FILED AUG. 18, 1904.
Fig.1.
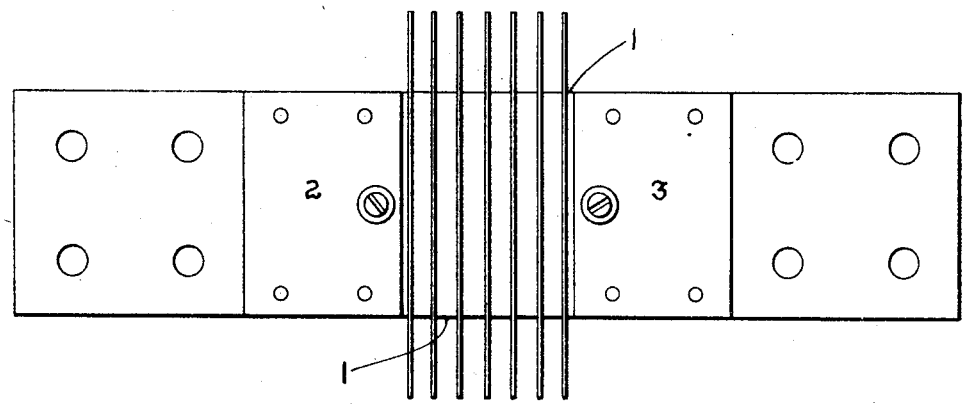
Fig.2.
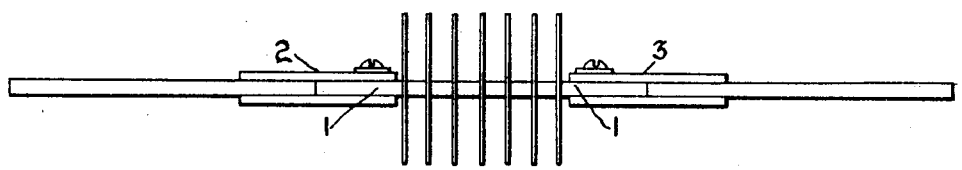
Fig.3. Fig.4.
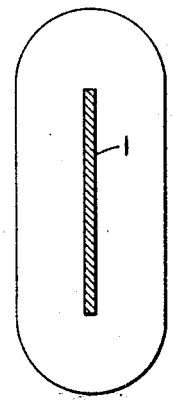 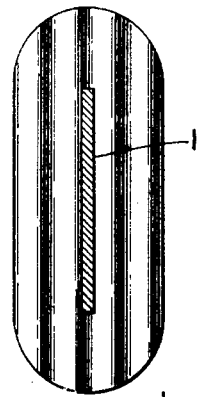

Witnesses:
Irving E. Stevo.
Steen Oxford
Inventor,
Lewis T. Robinson.
by Albert G. Davis
Atty.

No. 779,737.

Patented January 10, 1905.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

SHUNT FOR ELECTRICAL MEASURING INSTRUMENTS.

SPECIFICATION forming part of Letters Patent No. 779,737, dated January 10, 1905.

Application filed August 18, 1904. Serial No. 221,190.

*To all whom it may concern:*

Be it known that I, LEWIS T. ROBINSON, a citizen of the United States, residing at Schenectady, in the county of Schenectady and State of New York, have invented certain new and useful Improvements in Shunts for Electrical Measuring Instruments, of which the following is a specification.

In systems of electrical measurement as now practiced it is a common practice to measure current by a sensitive instrument which is so related to the circuit as to carry only a small fraction of the current passing, the value of the resistance in the path through the instrument being accurately predetermined relatively to the resistance of a shunt of large carrying capacity. The scale of the instrument is calibrated so as to read directly in amperes. Any system based on this principle involves as a necessary prerequisite that the shunt by which the difference of potential at the instrument-terminals is established shall be of constant resistance over the range of temperature through which it may be raised while in service either by changes in atmospheric temperature or by changes due to the $C^2 R$ loss.

It has been the general practice heretofore to employ as the material by which the fall of potential is created in the shunt one that shall have a small temperature coefficient for the working range of temperature—that is to say, such metals or alloys as vary to a minimum extent in resistance when heated. German silver is very often used for this purpose. This metal may be obtained with a fairly low coefficient, varying slightly according to its composition. For example, German silver having eighteen parts nickel, fifty copper, and thirty-two zinc in a hundred has a temperature coefficient of about $+.00026$ and a resistivity of thirty to thirty-four microhms. Certain nickel-iron and nickel-copper alloys, known under the names of "Climax," "Advance," "Prima Prima," &c., are also used, the coefficients being approximately: Climax, $+.0007$, with a resistivity of eighty-two to eighty-five microhms per cubic centimeter; Advance, temperature coefficient approximately zero, varying slightly positive or negative $.000012$, with a resistivity of forty-eight to fifty microhms; Prima Prima, temperature coefficient $-.000243$ up to $50°$ centigrade and then slightly greater, with a resistivity of forty-five or forty-six microhms. A resistance compound known as "manganin" is also frequently employed, having a temperature coefficient of $\pm.00001$, approximately. All of these metals have a high specific resistance and a low resistance change for a moderate range of temperature. As it is desirable, however, to make the shunts of small compass in order to save room at the switchboard or in the portable instrument on which they are used, it is desirable to run the current density in the resistance material as high as is practicable, and in doing so the material would be heated to a temperature which would disturb the accuracy of the readings in the instrument and would, moreover, destroy the stability of the alloy and would also raise the temperature of the bus-bars or other adjacent parts to an objectionable degree unless means were adopted to withdraw the heat.

It has heretofore been the practice to employ some means for cooling the shunt strip or strips, and this has been usually effected by subdividing the strip into a number of separate laminæ, each separately soldered at each end to a terminal by which connections with a bus-bar may be made. In order to accentuate the cooling, massive terminals have been provided for the shunt strip or strips of such capacity as to readily withdraw the heat from the shunt-strips, and thereby keep them at as nearly uniform a temperature as possible. Obviously, however, unless the terminals have an extremely large radiating-surface the heat is simply conveyed to the bus-bars and there dissipated. I have found by experiment that a single shunt-strip may be used having many times the cross-section of those commonly used and a large drop of potential may be maintained and the strip be kept at a uniform temperature throughout the whole of its length by employing a plurality of distributed metallic radiators fixed in good heat-conductive relation to the resistance-strip. For example, a resistance-strip two and one-half inches long between terminals and three-sixteenths of an inch thick and three inches wide, adapted to carry continuously a current of eight hundred amperes, having seven disks of copper two inches wide and five inches long mounted equidistantly upon it, gives a smaller temperature rise and attains a stable temperature more quickly than any shunt with which I am familiar and with the same temperature rise maintains a greater drop of potential between the terminals. A shunt of this construction, therefore, will have a minimum size for a definite capacity and will dissipate the watts lost in such a way as to produce a required difference of potential between its terminals more uniformly proportional to the current it carries than those heretofore used. This form of shunt is, I believe, entirely new and has many important advantages, which will be hereinafter more fully set forth. My invention is therefore characterized by a substantial cross-section of resistance-strip and a cooling agent so related thereto that a high current density may be maintained continuously without carrying heat out into the bus-bars.

In the accompanying drawings I have shown a shunt embodying my invention.

Figure 1 is a plan view. Fig. 2 is a side elevation. Fig. 3 represents a cross-section through the shunt-strip, and Figs. 4 and 5 represent a modified form of radiator.

1 represents a resistance-strip of German silver, manganin, or other metal having a low temperature coefficient. The strip is preferably in a single piece, but may be formed of a number of separate plates superposed and clamped or soldered together so as to bring them into intimate thermal relation. In either case it forms a bar of sufficient thickness to make a strong structure. In Fig. 1 the terminal is secured by two stiff plates 2 3, riveted to the terminals and the bar, and the shunt-strip is connected so as to produce a strong joint and preferably soldered so as to maintain a good electrically-conductive relation between the two. It is not absolutely essential that a terminal of a different nature or metal be employed, as the shunt-strip itself may be secured directly to the bus-bars. Arranged transversely on the strip or bar are a number of radiators distributed at short intervals along its length and mounted in any way to effect a good thermal relation. These may be soldered to the strip or may be cast integral therewith and may be plane in surface, as in Fig. 3, or fluted to give greater air exposure, as in Figs. 4 and 5. The large air exposure of good heat-conductors related by a short thermal path to distributed points of the resistance-strip is the most effective mode I know of maintaining a large and uniform potential drop.

It will be seen that in my type of shunt I do not rely upon the terminals or bus-bars to carry away and dissipate the heat, but provide means within the limits of the shunt-strip itself to effect this result, and by reason of such a construction I may employ any length of shunt-strip desired and am not necessarily confined to metals having high specific resistance. With fluctuating currents my shunt is especially useful, since it disposes of the increased heat due to an increase of load in the shortest time possible, since the radiators are in immediate thermal relation to the strip and act instantly to cool it, and a steady condition of temperature, and therefore of resistance, is reached in the shortest possible time after each change in load.

In comparative tests between the two types of construction I find that the type in common use heretofore continues to increase in temperature at the resistance-strips until the whole of the terminals and adjacent bus-bars or conductors in intimate relation thereto have attained their final temperature, whereas with my type a stable condition is attained in less than one-half the time and the bus-bars are not materially raised in temperature.

While I employ a large radiating-surface, it will be seen that I do not do so by increase of length and breadth of the strip itself, and therefore I can make my shunt very compact and yet of large capacity.

I prefer to mount the radiators or vanes in a vertical position, so as to take advantage of the cooling effect of convective air-currents, and I make these vanes of varying depth, according to the desired carrying capacity of the shunt.

While I have shown the radiators in the form of flat washers, various other forms may be employed with more or less advantage.

The feature described of making the shunt bar or strip of a single piece is of considerable advantage. It makes a stronger structure and requires a minimum number of soldered joints, and this permits the employment for the resistance material of desirable alloys, which are difficult to solder. With a single strip, as in my shunt, the joint can be examined and treated easily on all sides and can therefore be made thorough and reliable; but with several joints close together this becomes impracticable. The size of the bar will vary, of course, according to the specific resistance of the material employed for the resistance-body. With alloys having a specific resistance of forty-three microhms per cubic centimeter the bar may for a current of one thousand amperes be three inches wide and one-fourth inch thick and in the neighborhood of two inches long.

With a shunt of my construction as herein described not only is the temperature rise with the same amount of material employed less under the same conditions than with other types of shunts, but, as already stated, it occurs much more promptly, thereby increasing the accuracy and speed of reading. Moreover, there is no limit upon the length of the resistance-strip I may employ, since the tendency to increased heat by reason of increase of length is overcome by providing proportional increase of surface, and consequently in the power of the radiators to abstract heat. This is not true of types of shunts in which the cooling is chiefly maintained by the effect of the bus-bars and terminals, for in shunts constructed on this plan the length of the resistance-strips must of necessity be reasonably short or they will heat unduly in the center. For cases where a large drop of potential is required, therefore, my construction is peculiarly serviceable, as the drop of potential can be increased by increasing only the length of the resistance bar or plate and the number and surface of the radiators.

While I prefer to use as the resistance material one having as low a temperature coefficient as possible, other things being equal, my invention admits of good results with metals having an appreciable coefficient, the instrument being calibrated accordingly, since the shunt takes its final temperature promptly after any change of load.

What I claim as new, and desire to secure by Letters Patent of the United States, is—

1. A shunt for electrical measuring instruments, comprising a resistance-strip having heat-radiators in good thermal relation at distributed points throughout its surface.

2. An electric shunt comprising a strip of metal having a small temperature coefficient and transverse metal heat-radiators distributed over its surface in good thermal relation to the strips.

3. An electric shunt comprising a metal bar studded with metal radiators, and terminals for connecting with bus-bars.

4. A measuring-instrument shunt consisting of a resistance-body of low temperature coefficient provided with transverse metal plates at distributed points and in good thermal relation to the resistance-body.

5. A measuring-instrument shunt consisting of a resistance-body of low temperature coefficient, and a plurality of metal washers secured thereto transversely in good thermal relation, said body having a large joint area for connection with the main circuit.

6. An electric shunt consisting of a bar of metal of high resistivity and low temperature coefficient having terminals of low-resistance metal, said bar being in good thermal relation throughout its extent to a heat conductive and diffusing agent.

In witness whereof I have hereunto set my hand this 17th day of August, 1904.

LEWIS T. ROBINSON.

Witnesses:
BENJAMIN B. HULL,
HELEN ORFORD.